(12) United States Patent
Abe et al.

(10) Patent No.: US 12,572,007 B2
(45) Date of Patent: Mar. 10, 2026

(54) OPTICAL SCANNING DEVICE AND ABNORMALITY DETECTION METHOD

(71) Applicant: FUJIFILM Corporation, Tokyo (JP)

(72) Inventors: Masaaki Abe, Kanagawa (JP);
Takayuki Naono, Kanagawa (JP);
Yosuke Nishiura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 329 days.

(21) Appl. No.: 18/300,979

(22) Filed: Apr. 14, 2023

(65) Prior Publication Data

US 2023/0350191 A1     Nov. 2, 2023

(30) Foreign Application Priority Data

Apr. 28, 2022     (JP) ................................. 2022-075198

(51) Int. Cl.
*G02B 26/08* (2006.01)
*G02B 26/10* (2006.01)

(52) U.S. Cl.
CPC ....... *G02B 26/0858* (2013.01); *G02B 26/101* (2013.01)

(58) Field of Classification Search
CPC .............. G02B 26/0858; G02B 26/101; G02B 26/0833; G02B 26/10; G02B 26/105; G01S 7/481; G01S 7/4814; G01S 7/4817; B81B 7/02; G01B 7/30; G01B 21/22
See application file for complete search history.

(56) References Cited

U.S. PATENT DOCUMENTS

| | | | |
|---|---|---|---|
| 2008/0180633 A1 | 7/2008 | Yamada et al. | |
| 2017/0176743 A1 | 6/2017 | Kitazawa et al. | |
| 2017/0214891 A1* | 7/2017 | Tsukamoto | ........ G02B 26/0858 |
| 2020/0132981 A1 | 4/2020 | Van Lierop et al. | |
| 2020/0271921 A1 | 8/2020 | Kimura | |

FOREIGN PATENT DOCUMENTS

| | | |
|---|---|---|
| JP | 6-123845 A | 5/1994 |
| JP | 2015-132762 A | 7/2015 |
| JP | 2016-80978 A | 5/2016 |
| JP | 2017-134391 A | 8/2017 |
| JP | 2020-134879 A | 8/2020 |

OTHER PUBLICATIONS

Extended European Search Report for corresponding European Application No. 23167690.9, dated Sep. 27, 2023.
Japanese Office Action for corresponding Japanese Application No. 2022-075198, dated Sep. 16, 2025, with English translation.

* cited by examiner

*Primary Examiner* — Euncha P Cherry
(74) *Attorney, Agent, or Firm* — Birch, Stewart, Kolasch & Birch, LLP

(57)     ABSTRACT

An optical scanning device of the present disclosure includes: a micromirror device including a mirror that has a reflecting surface for reflecting light and is swingable around at least one axis, an actuator that allows the mirror to swing, and a piezoelectric element that generates and outputs electromotive force by the swinging of the mirror; a control device configured to control an operation of the actuator; and an abnormality detection device configured to detect an abnormal operation of the mirror based on a temporal fluctuation amount in an output signal from the piezoelectric element.

5 Claims, 11 Drawing Sheets

| EVALUATION ITEM | | | EXAMPLE 1 | EXAMPLE 2 | EXAMPLE 3 | EXAMPLE 4 | EXAMPLE 5 | EXAMPLE 6 | EXAMPLE 7 | COMPARATIVE EXAMPLE 1 | COMPARATIVE EXAMPLE 2 |
|---|---|---|---|---|---|---|---|---|---|---|---|
| | | Δt/T | 0.01% | 0.05% | 0.10% | 0.50% | 1% | 10% | 15% | - | - |
| EVALUATION RESULT | | WAVEFORM | | | | | | | | | |
| DETECTION TIME | | A | P | P | P | P | P | F1 | F2 | F2 | F2 |
| | | B | P | P | P | P | P | F1 | F2 | F2 | F2 |
| | | C | P | P | P | P | P | F1 | F2 | F2 | F2 |
| | | D | P | P | P | P | P | F1 | F2 | F2 | F2 |
| DETECTION OMISSION | | A | P | P | P | P | P | P | F1 | F1 | F1 |
| | | B | P | P | P | P | P | P | F1 | F1 | F1 |
| | | C | P | P | P | P | P | P | F1 | F1 | F1 |
| | | D | P | P | P | P | P | P | F1 | F1 | F1 |
| ERRONEOUS DETECTION | | A | P | P | P | P | P | P | P | P | P |
| | | B | F1 | P | P | P | P | P | P | P | F2 |
| | | C | P | P | P | P | P | F1 | F1 | P | P |
| | | D | F1 | F1 | P | P | P | F1 | F1 | P | F2 |

OPTICAL SCANNING DEVICE AND ABNORMALITY DETECTION METHOD

CROSS-REFERENCE TO RELATED APPLICATIONS

The present application claims priority under 35 U.S.C. § 119 to Japanese Patent Application No. 2022-075198 filed on Apr. 28, 2022. The above application is hereby expressly incorporated by reference, in its entirety, into the present application.

BACKGROUND

1. Technical Field

The technology of the present disclosure relates to an optical scanning device and an abnormality detection method.

2. Description of the Related Art

A micromirror device (also referred to as a microscanner) is known as one of micro electro mechanical systems (MEMS) devices manufactured using a silicon (Si) nano-fabrication technique. A mirror and an actuator that allows the mirror to swing are formed in the micromirror device. Since this micromirror device has a small size and low power consumption, the micromirror device is used in a laser scanner such as light detection and ranging (LiDAR) or head-up display (HUD).

In the laser scanner such as LiDAR or HUD, it is important to ensure user safety. For example, in a case in which an operation of the mirror is stopped in a state in which an output of laser light from a light source is on, it is dangerous because the laser light is continuously emitted to the same position. Therefore, it is required to detect an abnormal operation of the mirror at high speed during the operation.

JP2017-134391A discloses that an abnormality is detected based on a current flowing through a driving piezoelectric portion as an actuator. In addition, JP2017-134391A discloses that an abnormality is detected by a detection piezoelectric portion provided separately from the driving piezoelectric portion.

JP2015-132762A and JP2016-080978A disclose that abnormality is detected based on an amplitude of a mirror detected by a piezoelectric element for abnormality detection in a micromirror device.

JP1994-123845A (JP06-123845A) discloses that a sensor for detecting a state of a mirror is provided, and that detection is performed based on a phase difference between a scanning position of the mirror and a driving voltage or a maximum scanning angle (that is, an amplitude) of the mirror.

SUMMARY

However, in the detection method disclosed in JP2017-134391A, since the abnormality is detected based on the current flowing through the driving piezoelectric portion or the detection piezoelectric portion, it is considered that an abnormality other than a short circuit of the piezoelectric portion cannot be detected. In the detection methods disclosed in JP2015-132762A and JP2016-080978A, since there is a need to acquire and evaluate a waveform for one swing period in order to detect the amplitude of the mirror, the abnormal operation of the mirror cannot be detected at high speed. Similarly, in the detection method disclosed in JP1994-123845A (JP06-123845A), since there is a need to acquire and evaluate a waveform for one swing period in order to detect the phase difference or the amplitude, the abnormal operation of the mirror cannot be detected at high speed.

An object of the technology of the present disclosure is to provide an optical scanning device and an abnormality detection method with which an abnormal operation of a mirror can be detected at high speed during the operation.

In order to achieve the above object, an optical scanning device of the present disclosure comprises: a micromirror device including a mirror that has a reflecting surface for reflecting light and is swingable around at least one axis, an actuator that allows the mirror to swing, and a piezoelectric element that generates and outputs electromotive force by the swinging of the mirror; a control device configured to control an operation of the actuator; and an abnormality detection device configured to detect an abnormal operation of the mirror based on a temporal fluctuation amount in an output signal from the piezoelectric element.

It is preferable that the control device causes the mirror to resonate with a fixed swing period by driving the actuator.

It is preferable that the abnormality detection device detects an amount by which the output signal fluctuates in a time interval smaller than 10% of the swing period, as the fluctuation amount.

It is preferable that the abnormality detection device detects an amount by which the output signal fluctuates in a time interval smaller than 10% and larger than 0.05% of the swing period, as the fluctuation amount.

It is preferable that the abnormality detection device includes a detection part configured to detect the fluctuation amount and a determination part configured to determine whether or not the fluctuation amount is equal to or greater than a threshold value.

It is preferable that the detection part is configured of a delay circuit that delays the output signal output from the piezoelectric element by a certain period of time, and a differential amplification circuit that amplifies and outputs a difference between the output signal output from the piezoelectric element and the output signal delayed by the delay circuit.

It is preferable that the determination part is a comparator.

It is preferable that the mirror is swingable around a first axis and a second axis that are orthogonal to each other, and that the piezoelectric element generates the electromotive force by the swinging of the mirror around the first axis or the second axis.

An abnormality detection method of the present disclosure is an abnormality detection method of an optical scanning device including a micromirror device including a mirror that has a reflecting surface for reflecting light and is swingable around at least one axis, an actuator that allows the mirror to swing, and a piezoelectric element that generates and outputs electromotive force by the swinging of the mirror, and a control device configured to control an operation of the actuator, the method comprising: detecting an abnormal operation of the mirror based on a temporal fluctuation amount in an output signal from the piezoelectric element.

According to the technology of the present disclosure, it is possible to provide an optical scanning device and an abnormality detection method with which an abnormal operation of a mirror can be detected at high speed during the operation.

BRIEF DESCRIPTION OF THE DRAWINGS

Exemplary embodiments according to the technique of the present disclosure will be described in detail based on the following figures, wherein:

FIG. 6 is a block diagram showing an example of a configuration of an abnormality detection device, FIG. 11 is a diagram showing an evaluation result.

DETAILED DESCRIPTION

An example of an embodiment relating to the technology of the present disclosure will be described with reference to the accompanying drawings.

Figure 1:
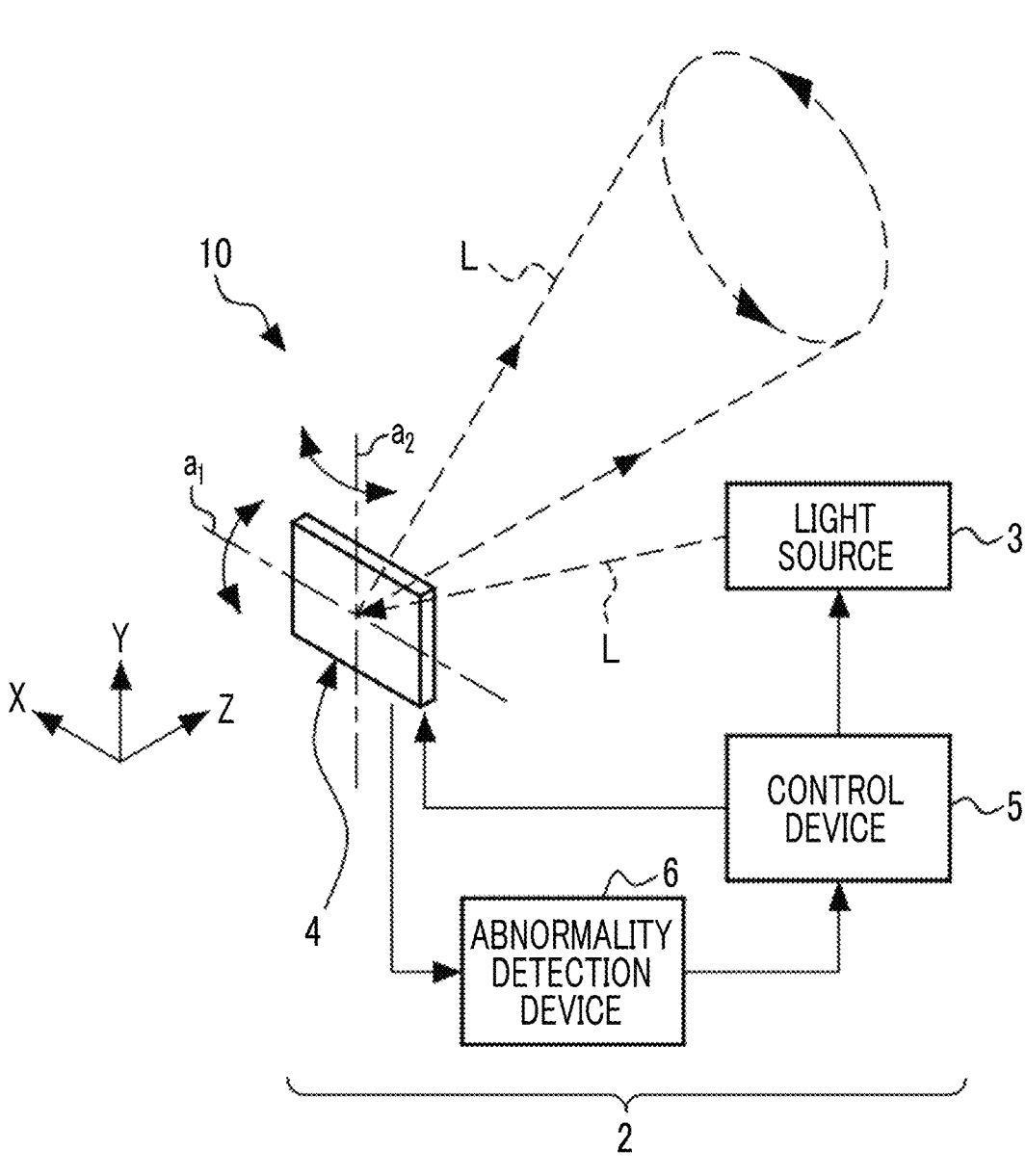
FIG. 1 is a schematic diagram of an optical scanning device.

FIG. 1 schematically shows an optical scanning system 10 according to an embodiment. The optical scanning system 10 includes an optical scanning device 2 and a light source 3. The optical scanning device 2 includes a micromirror device (hereinafter, referred to as a micro mirror device (MMD)) 4, a control device 5, and an abnormality detection device 6. The optical scanning system 10 is used in a laser scanner such as LiDAR or HUD.

The optical scanning device 2 performs optical scanning by reflecting laser light L incident from the light source 3 by the MMD 4 under a control of the control device 5. In a case in which the optical scanning system 10 is used in LiDAR, the optical scanning device 2 performs scanning with, for example, the laser light L in a helical shape. In the present embodiment, an optical scanning pattern is helical, but the optical scanning pattern is not limited to the helical shape and may be a Lissajous shape, a raster shape, or the like.

The MMD 4 is a piezoelectric biaxial drive type micromirror device capable of allowing a movable mirror 20 (see FIG. 2) to swing around a first axis $a_1$ and a second axis $a_2$ orthogonal to the first axis $a_1$. Hereinafter, a direction parallel to the first axis $a_1$ is referred to as an X direction, a direction parallel to the second axis $a_2$ is referred to as a Y direction, and a direction orthogonal to the first axis $a_1$ and the second axis $a_2$ is referred to as a Z direction.

The light source 3 is a laser device that emits the laser light L. The light source 3 emits the laser light L perpendicularly to a reflecting surface 20A (see FIG. 2) included in the movable mirror 20 in a state in which the movable mirror 20 of the MMD 4 is stationary. The laser light L is an example of "light" according to the technology of the present disclosure.

The control device 5 inputs a driving signal to the light source 3 and the MMD 4. The light source 3 generates the laser light L based on the input driving signal and emits the laser light L to the MMD 4. The MMD 4 allows the movable mirror 20 to swing around the first axis $a_1$ and the second axis $a_2$ based on the input driving signal.

The details will be described below, and the control device 5 causes the movable mirror 20 to resonate around the first axis $a_1$ and the second axis $a_2$. Thereby, a plane is scanned with the laser light L reflected by the movable mirror 20 such that a circle is drawn on the plane.

Details will be described below, and the abnormality detection device 6 detects an abnormal operation of the movable mirror 20 during the operation, based on a temporal fluctuation amount of an output signal output from a piezoelectric element provided as an angle sensor in the MMD 4.

Figure 2:
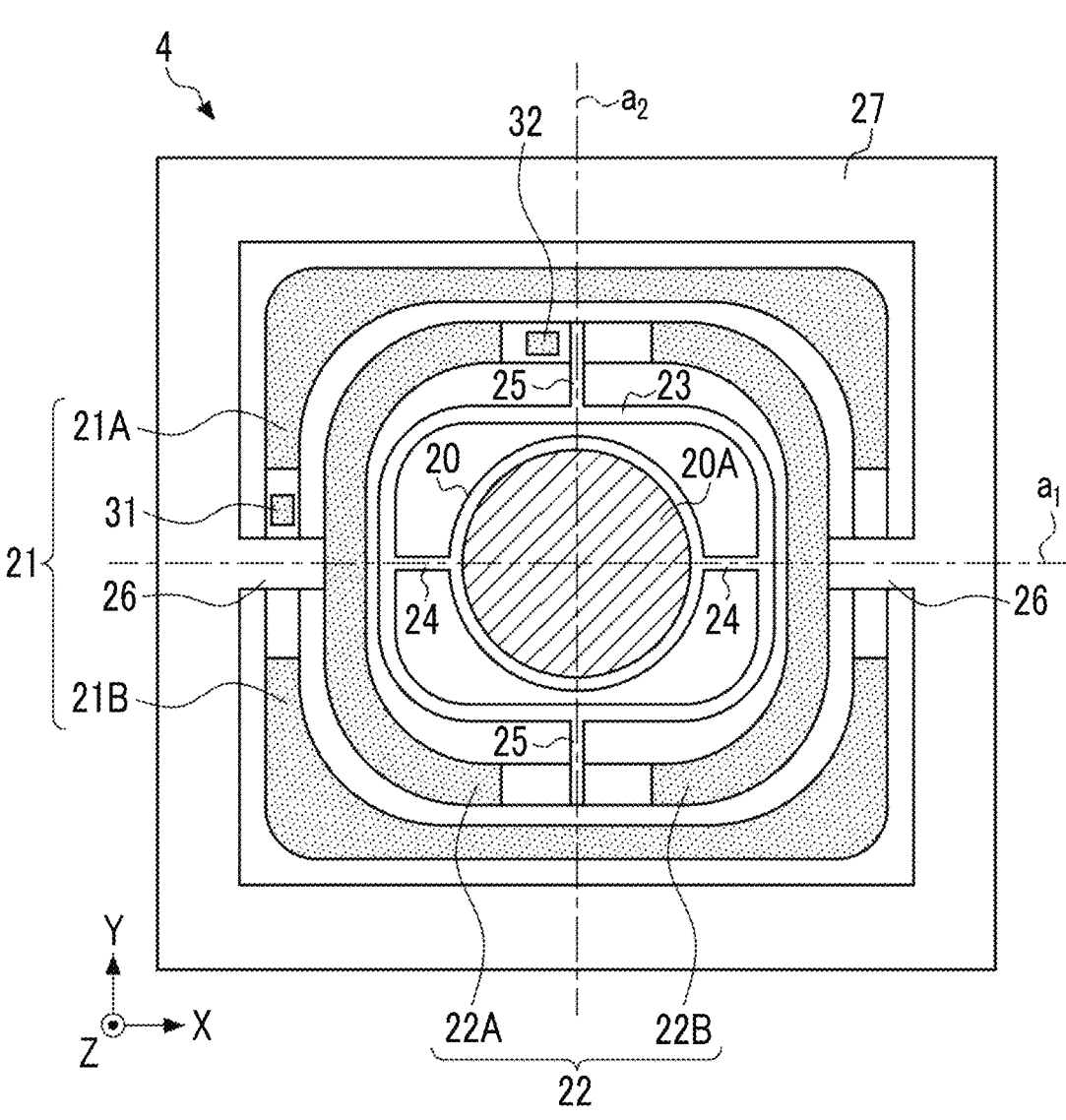
FIG. 2 is a schematic diagram of a micromirror device.

Next, an example of a configuration of the MMD 4 will be described with reference to FIG. 2. FIG. 2 is a schematic diagram of the MMD 4.

The MMD 4 has a movable mirror 20, a first actuator 21, a second actuator 22, a support frame 23, a first support portion 24, a second support portion 25, a connecting portion 26, and a fixed portion 27. The MMD 4 is formed, for example, by performing an etching treatment on a silicon on insulator (SOI) substrate. The movable mirror 20 is an example of a "mirror" according to the technology of the present disclosure.

The movable mirror 20 has a reflecting surface 20A for reflecting incidence light. The reflecting surface 20A is provided on one surface of the movable mirror 20, and is formed of a metal thin film such as gold (Au) and aluminum (Al). The reflecting surface 20A is, for example, circular.

The support frame 23 is disposed to surround the movable mirror 20. The second actuator 22 is disposed to surround the movable mirror 20 and the support frame 23. The first actuator 21 is disposed to surround the movable mirror 20, the support frame 23, and the second actuator 22.

The first support portion 24 connects the movable mirror 20 and the support frame 23 on the first axis $a_1$, and swingably supports the movable mirror 20 around the first axis $a_1$. The first axis $a_1$ is located in a plane including the reflecting surface 20A in a case in which the movable mirror 20 is stationary. For example, the first support portion 24 is a torsion bar stretched along the first axis $a_1$.

The second support portion 25 connects the support frame 23 and the second actuator 22 on the second axis $a_2$, and swingably supports the movable mirror 20 and the support frame 23 around the second axis $a_2$. The second axis $a_2$ is orthogonal to the first axis $a_1$ in the plane including the reflecting surface 20A in a case in which the movable mirror 20 is stationary.

The connecting portion 26 connects the first actuator 21 and the second actuator 22 on the first axis $a_1$. In addition, the connecting portion 26 connects the first actuator 21 and the fixed portion 27 on the first axis $a_1$.

The fixed portion 27 has a rectangular outer shape and surrounds the first actuator 21. Lengths of the fixed portion 27 in the X direction and the Y direction are, for example, about 1 mm to 10 mm, respectively. A thickness of the fixed portion 27 in the Z direction is, for example, about 5 μm to 0.2 mm.

The first actuator 21 and the second actuator 22 are piezoelectric actuators each comprising a piezoelectric element. The first actuator 21 applies rotational torque around the first axis $a_1$ to the movable mirror 20. The second actuator 22 applies rotational torque around the second axis $a_2$ to the movable mirror 20. Thereby, the movable mirror 20 swings around the first axis $a_1$ and around the second axis $a_2$.

The first actuator 21 is an annular thin plate member that surrounds the movable mirror 20, the support frame 23, and the second actuator 22 in the XY plane. The first actuator 21 is composed of a pair of a first movable portion 21A and a second movable portion 21B. Each of the first movable portion 21A and the second movable portion 21B is substantially semi-annular. The first movable portion 21A and the second movable portion 21B have a shape that is line-symmetrical with respect to the first axis $a_1$, and are connected on the first axis $a_1$.

The support frame 23 is an annular thin plate member that surrounds the movable mirror 20 in the XY plane.

The second actuator 22 is an annular thin plate member that surrounds the movable mirror 20 and the support frame 23 in the XY plane. The second actuator 22 is composed of a pair of a first movable portion 22A and a second movable portion 22B. Each of the first movable portion 22A and the second movable portion 22B is semi-annular. The first movable portion 22A and the second movable portion 22B have a shape that is line-symmetrical with respect to the second axis $a_2$, and are connected on the second axis $a_2$.

In the first actuator 21, the first movable portion 21A and the second movable portion 21B are each provided with a piezoelectric element. In addition, in the second actuator 22, the first movable portion 22A and the second movable portion 22B are each provided with a piezoelectric element.

In addition, the MMD 4 has a first angle detection sensor 31 and a second angle detection sensor 32 composed of a piezoelectric element. The first angle detection sensor 31 is provided, for example, on the first movable portion 21A and in the vicinity of the connecting portion 26. The first angle detection sensor 31 generates and outputs electromotive force by the swinging of the movable mirror 20 around the first axis $a_1$. That is, the first angle detection sensor 31 outputs a signal corresponding to an angle of the movable mirror 20 around the first axis $a_1$.

The second angle detection sensor 32 is provided, for example, on the first movable portion 22A and in the vicinity of the second support portion 25. The second angle detection sensor 32 generates and outputs electromotive force by the swinging of the movable mirror 20 around the second axis $a_2$. That is, the second angle detection sensor 32 outputs a signal corresponding to an angle of the movable mirror 20 around the second axis $a_2$.

The control device 5 performs a feedback control of correcting the driving signals applied to the first actuator 21 and the second actuator 22 based on the signals output from the first angle detection sensor 31 and the second angle detection sensor 32.

Figure 3:
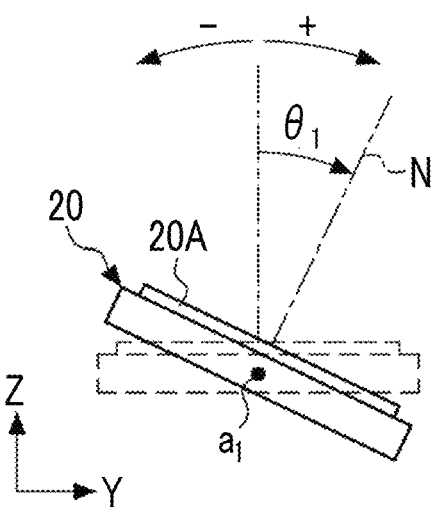
FIG. 3 is a diagram showing a first deflection angle of a movable mirror.
Figure 4:
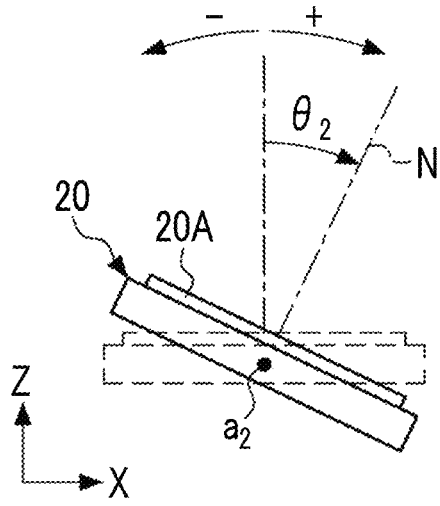
FIG. 4 is a diagram showing a second deflection angle of the movable mirror.

FIG. 3 and FIG. 4 show a deflection angle in a case in which the movable mirror 20 swings. FIG. 3 shows a deflection angle (hereinafter, referred to as a first deflection angle) $\theta_1$ of the movable mirror 20 around the first axis $a_1$.

FIG. 4 shows a deflection angle (hereinafter, referred to as a second deflection angle) $\theta_2$ of the movable mirror 20 around the second axis $a_2$.

As shown in FIG. 3, an angle at which a normal line N of the reflecting surface 20A of the movable mirror 20 is inclined in the YZ plane is called a first deflection angle $\theta_1$. In a case in which the normal line N of the reflecting surface 20A is inclined in the +Y direction, the first deflection angle $\theta_1$ takes a positive value, and in a case in which it is inclined in the –Y direction, the first deflection angle $\theta_1$ takes a negative value.

The first deflection angle $\theta_1$ is controlled by the driving signal (hereinafter, referred to as a first driving signal) applied to the first actuator 21 by the control device 5. The first driving signal is, for example, a sinusoidal AC voltage. The first driving signal includes a driving voltage waveform $V_{1A}$ (t) applied to the first movable portion 21A and a driving voltage waveform $V_{1B}$ (t) applied to the second movable portion 21B. The driving voltage waveform $V_{1A}$ (t) and the driving voltage waveform $V_{1B}$ (t) are in an anti-phase with each other (that is, a phase difference is 180°).

As shown in FIG. 4, an angle at which a normal line N of the reflecting surface 20A of the movable mirror 20 is inclined in the XZ plane is called a second deflection angle $\theta_2$. In a case in which the normal line N of the reflecting surface 20A is inclined in the +X direction, the second deflection angle $\theta_2$ takes a positive value, and in a case in which it is inclined in the –X direction, the second deflection angle $\theta_2$ takes a negative value.

The second deflection angle $\theta_2$ is controlled by the driving signal (hereinafter, referred to as a second driving signal) applied to the second actuator 22 by the control device 5. The second driving signal is, for example, a sinusoidal AC voltage. The second driving signal includes a driving voltage waveform $V_{2A}$ (t) applied to the first movable portion 22A and a driving voltage waveform $V_{2B}$ (t) applied to the second movable portion 22B. The driving voltage waveform $V_{2A}$ (t) and the driving voltage waveform $V_{2B}$ (t) are in an anti-phase with each other (that is, the phase difference is 180°).

Figure 5:
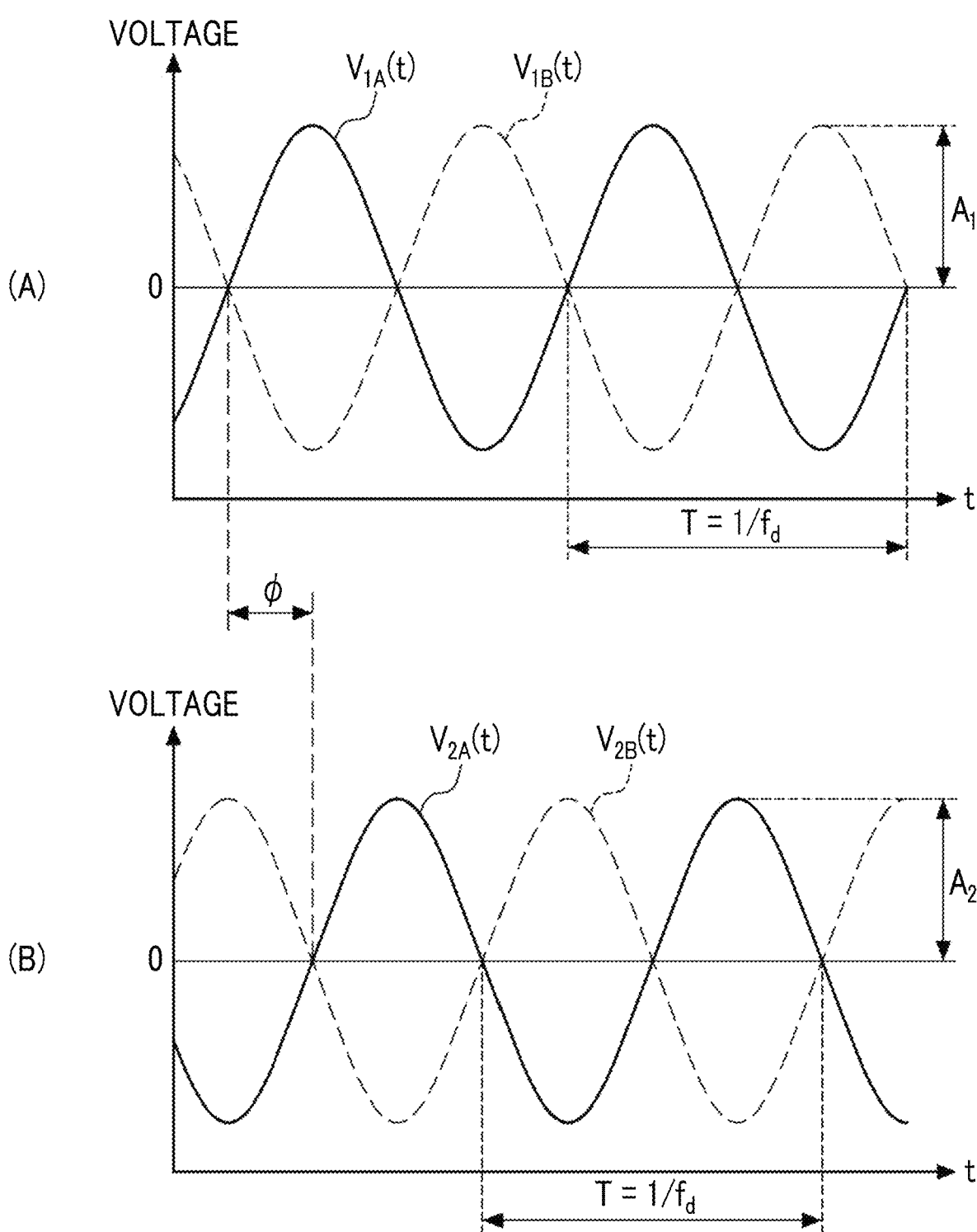
FIG. 5 is a diagram showing an example of a driving signal applied to a first actuator and a second actuator.

FIG. 5 shows an example of a driving signal applied to the first actuator 21 and the second actuator 22. (A) of FIG. 5 shows the driving voltage waveforms $V_{1A}$ (t) and $V_{1B}$ (t) included in the first driving signal. (B) of FIG. 5 shows the driving voltage waveforms $V_{2A}$ (t) and $V_{2B}$ (t) included in the second driving signal.

The driving voltage waveforms $V_{1A}$ (t) and $V_{1B}$ (t) are represented by Equations (1A) and (1B), respectively.

$$V_{1A}(t)=A_1 \sin(2\pi f_d t) \tag{1A}$$

$$V_{1B}(t)=A_1 \sin(2\pi f_d t+\pi) \tag{1B}$$

Here, t is a time $f_d$ is a driving frequency. $A_1$ is an amplitude. A phase difference between the driving voltage waveform $V_{1A}$ (t) and the driving voltage waveform $V_{1B}$ (t) is $\pi$ (that is, 180°).

The driving voltage waveforms $V_{2A}$ (t) and $V_{2B}$ (t) are represented by Equations (2A) and (2B), respectively.

$$V_{2A}(t)=A_2 \sin(2\pi f_d t+\varphi) \tag{2A}$$

$$V_{2B}(t)=A_2 \sin(2\pi f_d t+\pi+\varphi) \tag{2B}$$

Here, $A_2$ is an amplitude. A phase difference between the driving voltage waveform $V_{2A}$ (t) and the driving voltage waveform $V_{2B}$ is $\pi$ (that is, 180°). $\varphi$ is a phase difference between the driving voltage waveform $V_{1A}$ (t) and the driving voltage waveform $V_{2A}$ (t). In the present embodiment, $\varphi$=90° is set in order to cause the movable mirror 20 to perform precession to form the optical scanning pattern in a helical shape. Note that the amplitudes $A_1$ and $A_2$ may be changed in accordance with the time t.

In the present embodiment, the driving frequency $f_d$ is set as a resonance frequency of the movable mirror 20. Thereby, the movable mirror 20 resonates with a fixed swing period T. The swing period T is represented by $T=1/f_d$.

Figure 6:
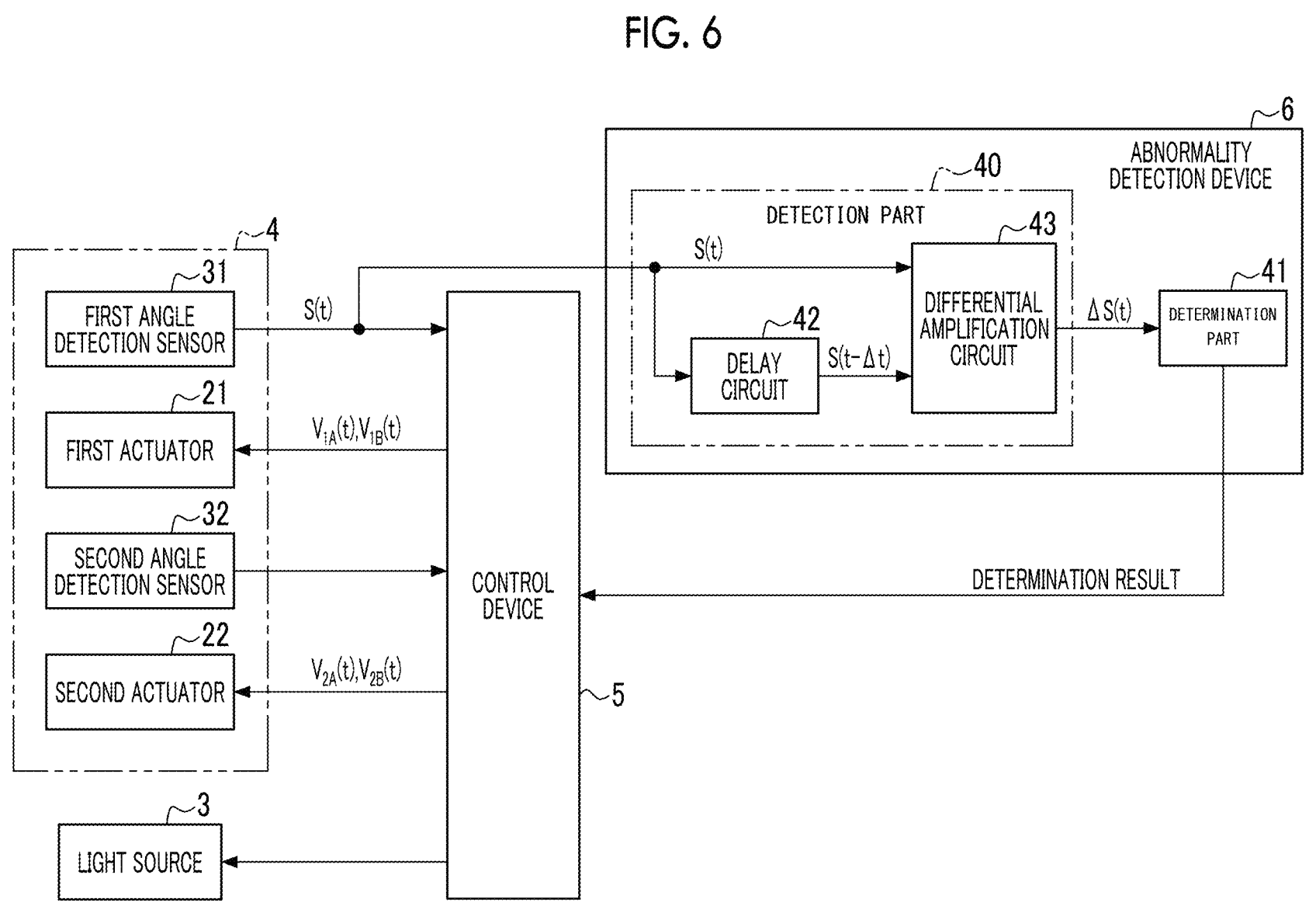

FIG. 6 shows an example of a configuration of the abnormality detection device 6. The abnormality detection device 6 includes a detection part 40 and a determination part 41. The detection part 40 is composed of a delay circuit 42 and a differential amplification circuit 43. In the present embodiment, the abnormality detection device 6 performs abnormality detection by using the output signal output from the first angle detection sensor 31 out of the output signals output from the first angle detection sensor 31 and the second angle detection sensor 32 to the control device 5. Hereinafter, the output signal output from the first angle detection sensor 31 is denoted by S (t).

The output signal S (t) from the first angle detection sensor 31 is input to the detection part 40. Specifically, the output signal S (t) is input to the delay circuit 42 and the differential amplification circuit 43. The delay circuit 42 delays the input output signal S (t) by a certain period of time Δt and outputs the signal. Hereinafter, the signal output from the delay circuit 42 is referred to as a delay signal S (t−Δt). Hereinafter, the time Δt is referred to as a delay time Δt. The delay time Δt is shorter than the swing period T.

The delay signal S (t−Δt) output from the delay circuit 42 is input to the differential amplification circuit 43. The differential amplification circuit 43 amplifies and outputs a difference between the output signal S (t) and the delay signal S (t−Δt). That is, the delay circuit 42 adjusts a phase of the output signal S (t) to obtain the delay signal S (t−Δt). Hereinafter, the output signal output from the differential amplification circuit 43 is referred to as a fluctuation amount ΔS (t). The fluctuation amount ΔS (t) represents a temporal fluctuation amount of the output signal S (t) from the first angle detection sensor 31. In other words, the fluctuation amount ΔS (t) represents an amount by which the output signal S (t) fluctuates in a time interval smaller than the swing period T.

The fluctuation amount ΔS (t) output from the differential amplification circuit 43 is input to the determination part 41. The determination part 41 is composed of a comparator. The determination part 41 determines whether or not the fluctuation amount ΔS (t) is equal to or greater than a threshold value Vth, and outputs a determination result to the control device 5. Here, the fact that the fluctuation amount ΔS (t) is equal to or greater than the threshold value Vth means that an absolute value of the fluctuation amount ΔS (t) is equal to or greater than the threshold value Vth, in other words, ΔS (t)≥Vth, or ΔS (t)≤−Vth.

The control device 5 stops the operations of the light source 3 and the MMD 4 according to the determination result output from the determination part 41. Specifically, the control device 5 stops the operations of the light source 3 and the MMD 4 in a case in which the determination part 41 determines that the fluctuation amount ΔS (t) is equal to or greater than the threshold value Vth.

Figure 7:
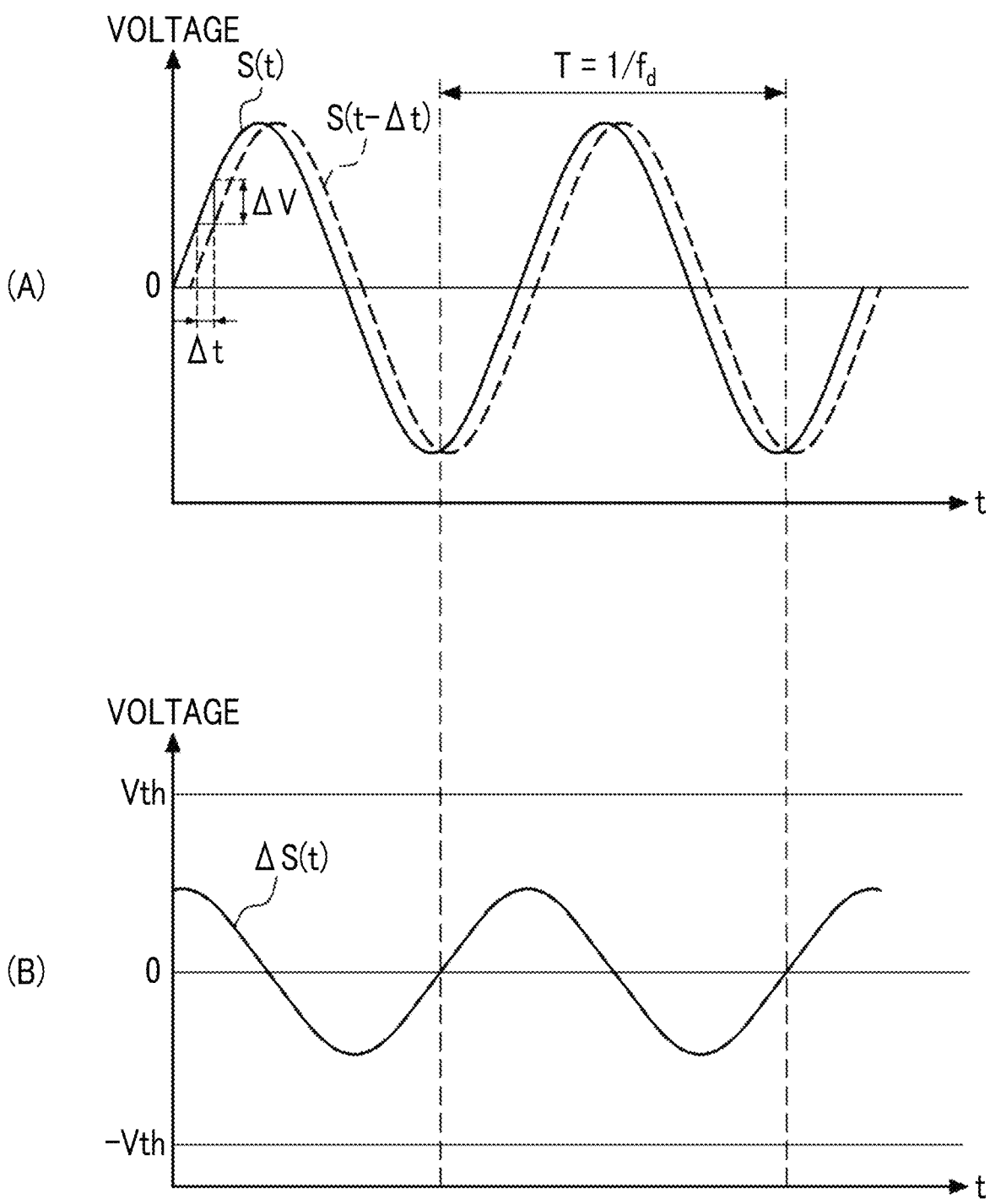
FIG. 7 is a diagram schematically showing an example of an output signal, a delay signal, and a fluctuation amount in a case in which the movable mirror is normally operated.

FIG. 7 schematically shows an example of the output signal S (t), the delay signal S (t−Δt), and the fluctuation amount ΔS (t) in a case in which the movable mirror 20 is normally operated. (A) of FIG. 7 shows an example of the output signal S(t) and the delay signal S (t−Δt). (B) of FIG. 7 shows an example of the fluctuation amount ΔS (t).

In a case in which the movable mirror 20 resonates with a fixed swing period T, the output signal S (t) ideally becomes a substantially sinusoidal wave, as shown in (A) of FIG. 7. In (A) of FIG. 7, the output signal S (t) is shown by a solid line, and the delay signal S (t−Δt) is shown by a broken line. The fluctuation amount ΔS (t) shown in (B) of FIG. 7 corresponds to a fluctuation voltage ΔV of the output signal S (t) with respect to the delay time Δt. The fluctuation amount ΔS (t) ideally becomes a substantially sinusoidal wave.

Figure 8:
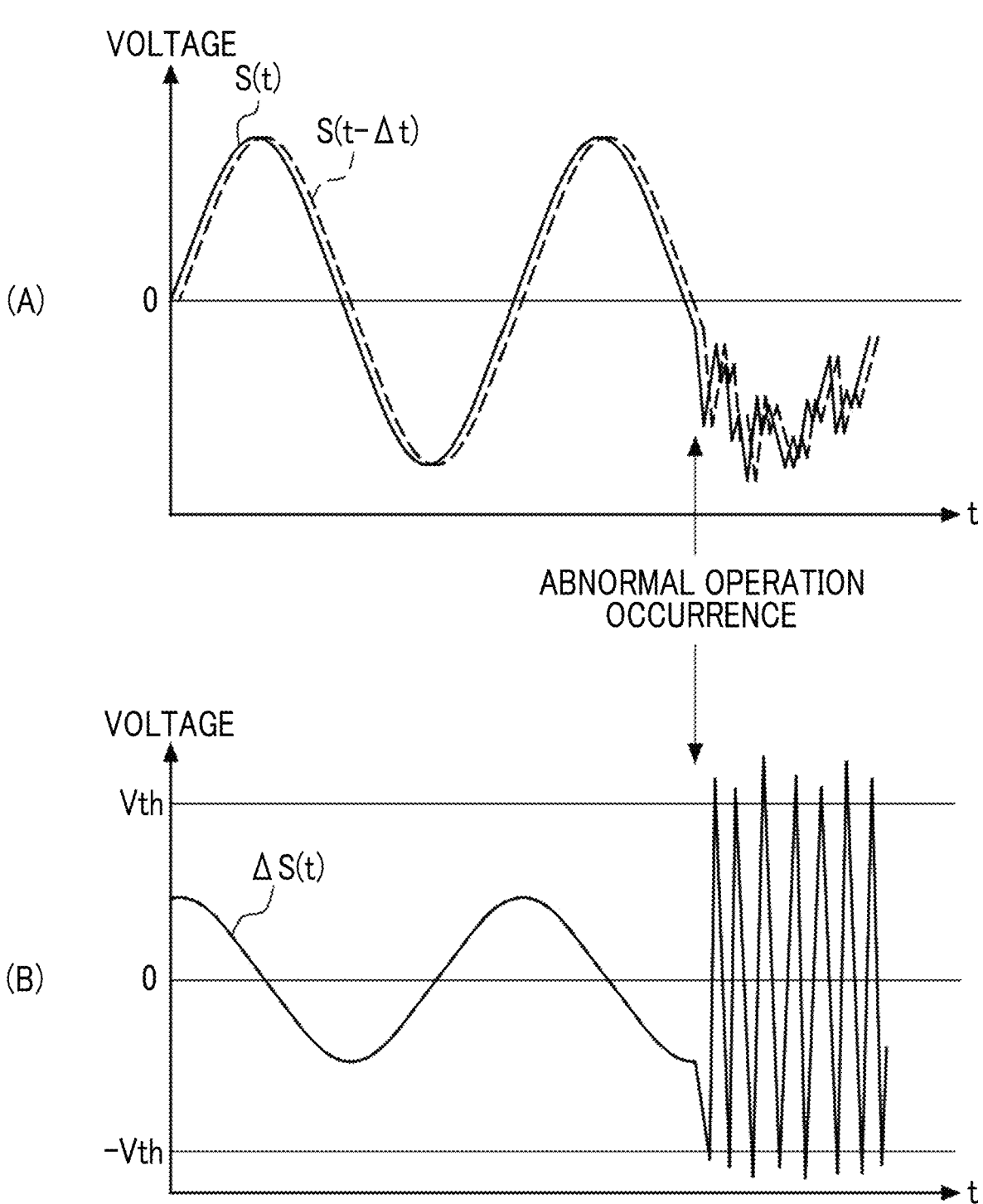
FIG. 8 is a diagram schematically showing an example of an output signal, a delay signal, and a fluctuation amount in a case in which an abnormal operation occurs in the movable mirror.

FIG. 8 schematically shows an example of the output signal S (t), the delay signal S (t−Δt), and the fluctuation amount ΔS (t) in a case in which an abnormal operation occurs in the movable mirror 20. (A) of FIG. 8 shows an example of the output signal S (t) and the delay signal S (t−Δt). (B) of FIG. 8 shows an example of the fluctuation amount ΔS (t).

As shown in FIG. 8, in a case in which an abnormal operation occurs in the movable mirror 20, the fluctuation amount ΔS (t) greatly changes to be equal to or greater than the threshold value Vth, and the determination part 41 determines that the operation of the movable mirror 20 is abnormal.

Even in a case in which the operation of the movable mirror 20 is normal, the waveform of the output signal S(t) may be distorted because of occurrence of noise, crosstalk, or the like. The crosstalk is caused by interference between the driving signals applied to the first actuator 21 and the second actuator 22, or by the swinging around one axis of the movable mirror 20 affecting the swinging around the other axis. In order to accurately detect the abnormal operation of the movable mirror 20 regardless of the influence of noise, crosstalk, or the like, it is necessary to set the delay time Δt within an appropriate range. Specifically, it is preferable to set a ratio (Δt/T) of the delay time Δt to the swing period T within an appropriate range.

For example, it is preferable to define an upper limit value to satisfy Δt/T<10%. In this case, the detection part 40 detects an amount by which the output signal S (t) fluctuates in a time interval smaller than 10% of the swing period T, as the fluctuation amount ΔS (t). In addition, it is more preferable to define an upper limit value and a lower limit value to satisfy 0.05%<Δt/T<10%. In this case, the detection part 40 detects an amount by which the output signal S (t) fluctuates in a time interval smaller than 10% and greater than 0.05% of the swing period T, as the fluctuation amount ΔS (t).

Verification of Effect by Experiment

By using the abnormality detection device 6 configured as described above, it is possible to detect the abnormal operation of the movable mirror 20 at high speed during the operation. In order to verify this effect, the present applicant manufactured a plurality of the MMD 4s and conducted an experiment.

Figure 9:
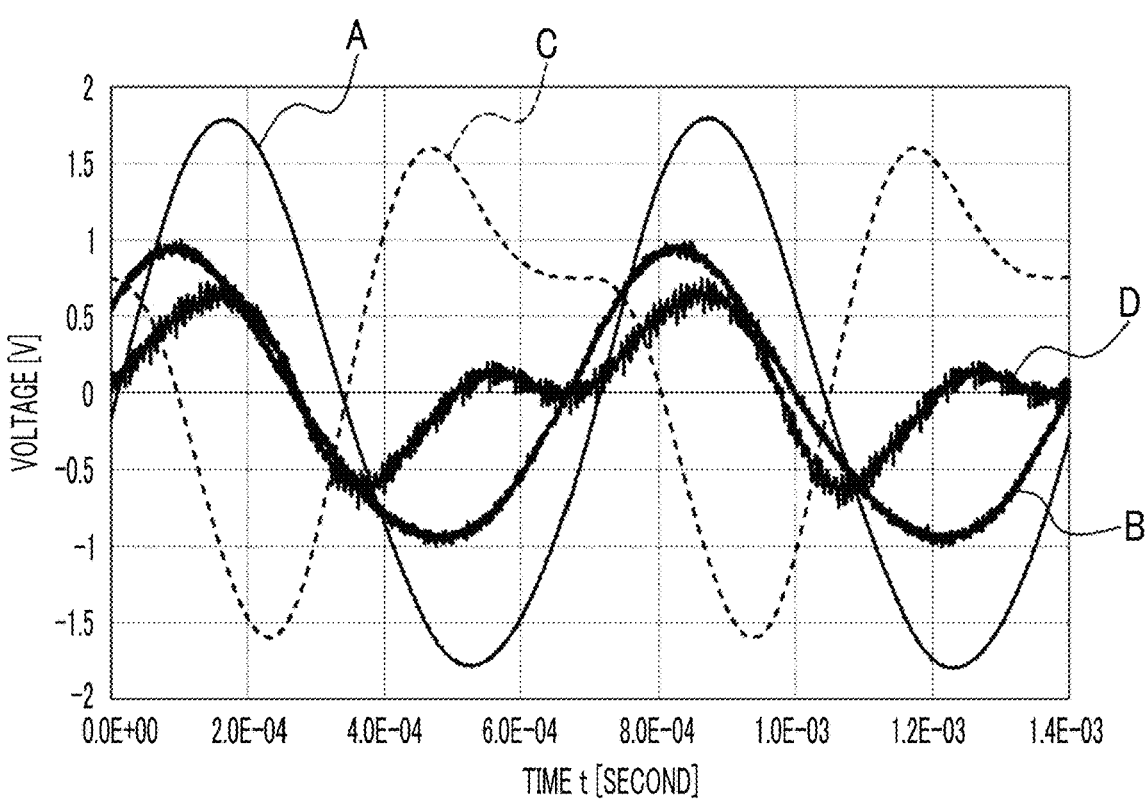
FIG. 9 is a diagram showing four types of waveforms used in an experiment.

Specifically, in order to evaluate an accuracy of abnormality detection due to a difference in waveform of the output signal S (t) from the first angle detection sensor 31, an experiment was conducted using four types of waveforms A to D. The four types of waveforms A to D were realized by changing a structure of the movable mirror 20, a disposition of the first angle detection sensor 31, and the like. FIG. 9 shows the four types of waveforms A to D used in the experiment. The waveform A is an ideal waveform (that is, a sinusoidal wave). The waveform B is a waveform including noise. The waveform C is a waveform including crosstalk. The waveform D is a waveform including crosstalk and noise.

With the manufactured MMD 4 having a driving frequency $f_d$ of about 1420 Hz and the movable mirror 20 performing precession, the output signal S (t) having the above four types of waveforms A to D was input to the abnormality detection device 6 to evaluate an accuracy of abnormality detection. The swing period T is about 704 μs. The abnormality detection device 6 evaluated an accuracy of abnormality detection for a plurality of ratios Δt/T by changing the delay time Δt.

In addition, since an abnormal operation is less likely to occur in a normal environment, an abnormal operation was caused to generate by operating the MMD 4 in a load environment. The load includes driving the MMD 4 in a high-temperature and high-humidity environment, applying an impact to the MMD 4 from an outside, and driving the MMD 4 with a high driving voltage.

Figure 10:
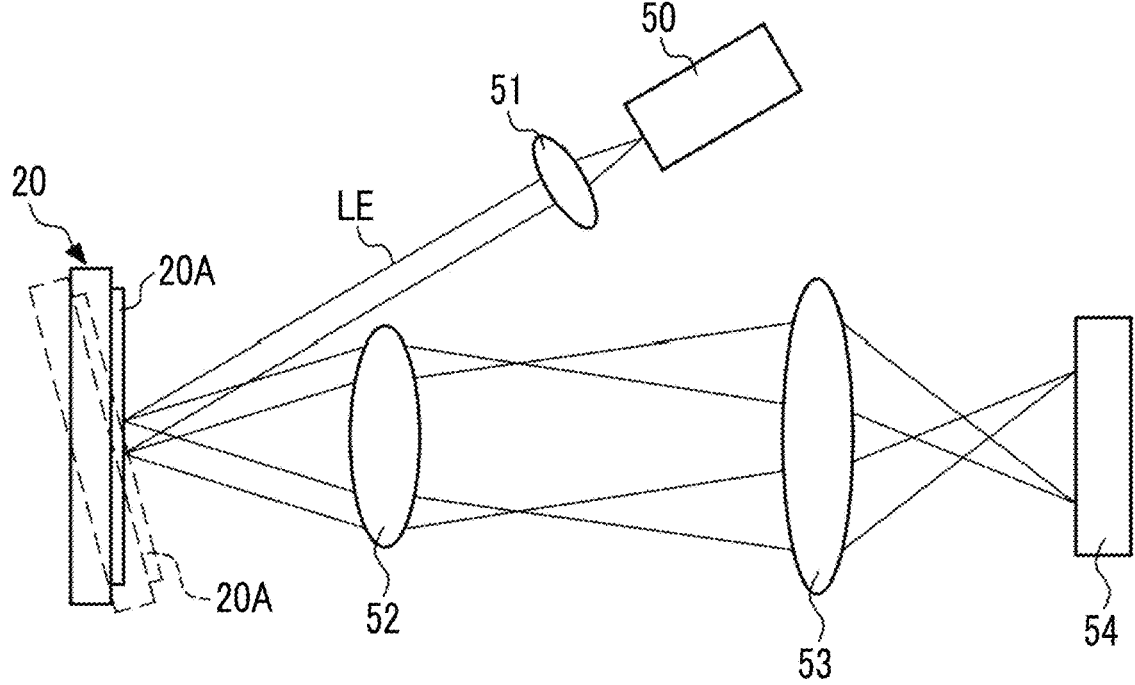
FIG. 10 is a diagram showing an example of an optical method.

A determination result of the abnormal operation based on a measured value obtained by directly measuring the operation of the movable mirror 20 by an optical method was used as an evaluation standard. FIG. 10 shows an example of the optical method. As shown in FIG. 10, evaluation laser light LE is emitted from an evaluation light source 50 to the reflecting surface 20A of the movable mirror 20 via a collimating lens 51, and reflected light from the reflecting surface 20A is formed into an image on a position sensitive detector (PSD) 54 via lenses 52 and 53. An image forming position obtained by the position sensitive detector is converted into a deflection angle of the movable mirror 20. In order to improve a conversion accuracy of the deflection angle, it is preferable that a reference mirror having a known angle is installed instead of the MMD 4 and that calibration for calibrating an angle and position information is executed.

The deflection angle (the first deflection angle $\theta_1$ and the second deflection angle $\theta_2$) of the movable mirror 20 was measured by the optical method described above, and a composite angle obtained by combining the first deflection angle $\theta_1$ and the second deflection angle $\theta_2$ was calculated. In a case in which the movable mirror 20 performs precession, the composite angle is constant. In a case in which the composite angle exceeds a range of ±10% from a steady-state value, it is determined that an abnormal operation has occurred, and a time at which the determination is made was used as a reference time.

The accuracy of abnormality detection by the abnormality detection device 6 was evaluated for a plurality of evaluation items. The evaluation items used in this experiment are "detection time", "detection omission", and "erroneous detection". The detection time is an evaluation item relating to a time at which an abnormal operation was detected (abnormality detection time). The detection omission is an evaluation item relating to whether or not an abnormal operation could be detected. The erroneous detection is an evaluation item relating to whether or not an abnormal operation was erroneously detected during a period from a start of the operation to the occurrence of the abnormal operation.

FIG. 11 shows an evaluation result. Examples 1 to 7 are experimental examples of abnormality detection using the abnormality detection device 6 of the present embodiment, in which the ratios Δt/T are different from each other because of different set values of the delay time Δt. Comparative Examples 1 and 2 are experimental examples of abnormality detection using the determination method in the related art based on the output signal S (t) without using the abnormality detection device 6 of the present embodiment.

In the evaluation result of the detection time, P indicates that, as a result of conducting the experiment using 100 samples, the latest abnormality detection time (worst detection time) was before the above-described reference time. F1 indicates that the worst detection time was later than the reference time and was less than 500 μs from the reference time. F2 indicates that the worst detection time was later than the reference time and was equal to or more than 500 μs from the reference time.

In the evaluation result of the detection omission, P indicates that, as a result of conducting the experiment using 100 samples, the abnormal operation could be detected for all the samples, that is, there was no detection omission. F indicates that the abnormal operation could not be detected for at least one sample, that is, there was a detection omission.

In the evaluation result of the erroneous detection, P indicates that, as a result of conducting the experiment using 100 samples, a value (erroneous detection rate) obtained by dividing the number of erroneously detected samples by the total number of the samples was less than 10%. F1 indicates that an erroneous detection rate was less than 50%. F2 indicates that an erroneous detection rate was equal to or more than 50%.

According to the evaluation result of the detection time, in any of the waveforms A to D, in a case in which Δt/T<10%, the detection time is earlier than the reference detection time by the optical method. That is, it can be seen that it is preferable that Δt/T<10% in order to detect the abnormal operation of the movable mirror 20 at high speed during the operation.

According to the evaluation result of the detection omission, it can be seen that there is no detection omission in a case in which Δt/T<10% in any of the waveforms A to D.

According to the evaluation result of the erroneous detection, it can be seen that the erroneous detection rate is less than 10% in a case in which Δt/T<10%, for the waveforms A and C not including noise. On the other hand, it can be seen that the erroneous detection rate is 10% or more in a case in which Δt/T≤0.05%, for the waveforms B and D including noise. That is, from the viewpoint of noise immunity, it is preferable that the lower limit value of Δt/T is 0.05%.

Figure 12:
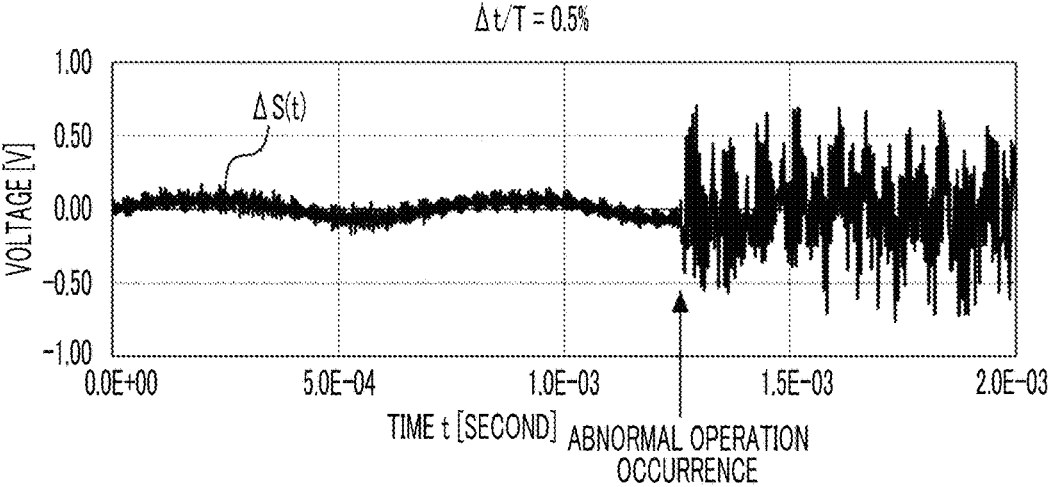
FIG. 12 is a diagram showing a waveform of a fluctuation amount in a case in which $\Delta t/T=0.5\%$.
Figure 13:
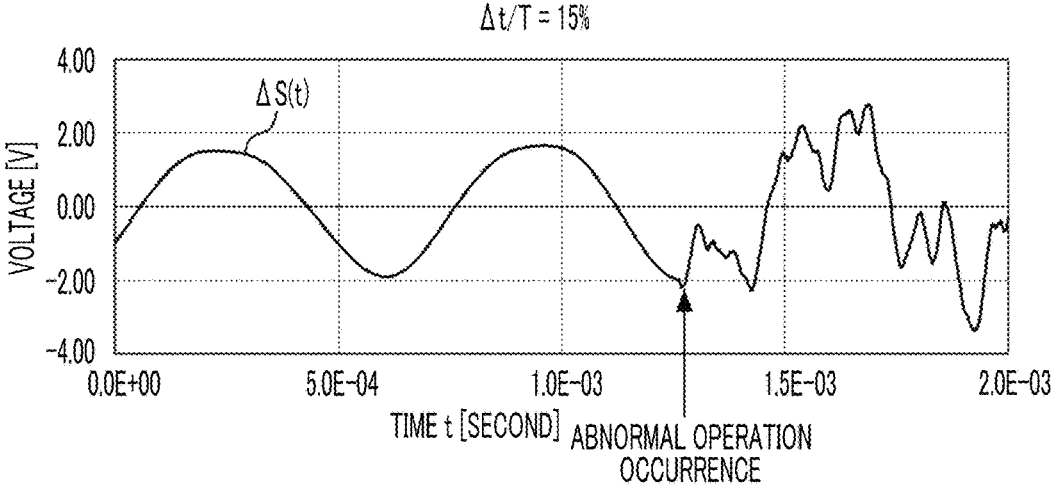
FIG. 13 is a diagram showing a waveform of a fluctuation amount in a case in which $\Delta t/T=15\%$.
Figure 14:
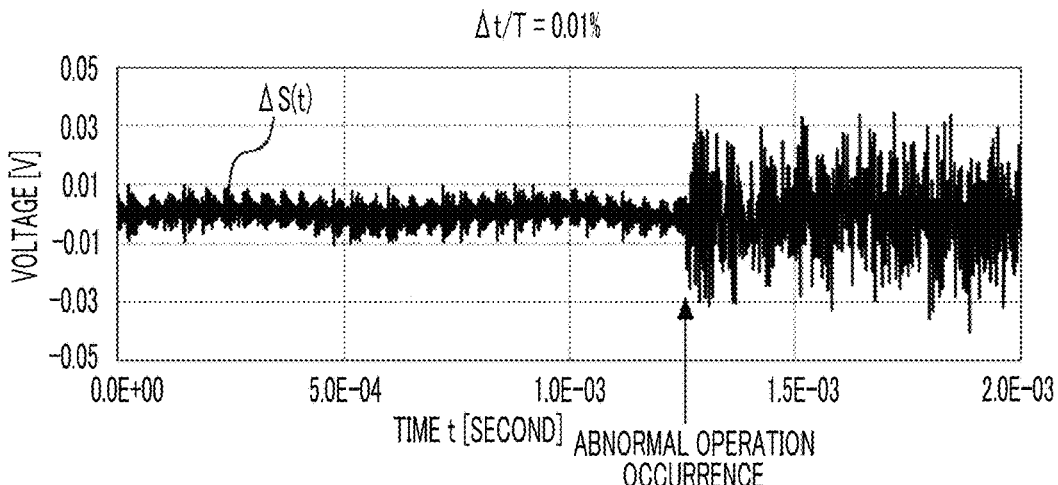
FIG. 14 is a diagram showing a waveform of a fluctuation amount in a case in which $\Delta t/T=0.01\%$.

FIGS. 12 to 14 show a waveform of the fluctuation amount ΔS (t). FIG. 12 shows a waveform of the fluctuation amount ΔS (t) in a case in which Δt/T=0.5%. FIG. 13 shows a waveform of the fluctuation amount ΔS (t) in a case in which Δt/T=15%. FIG. 14 shows a waveform of the fluctuation amount ΔS (t) in a case in which Δt/T=0.01%.

The waveform shown in FIG. 12 has a large difference in amplitude before and after the occurrence of the abnormal operation. That is, FIG. 12 shows that the abnormality detection can be performed at high speed and with high accuracy in a case in which 0.05%<Δt/T<10%.

In the waveform shown in FIG. 13, the difference in amplitude is small before and after the occurrence of the abnormal operation. That is, FIG. 13 shows that, in a case in which Δt/T≥10%, the accuracy of the abnormality detection is lower than in a case in which 0.05%<Δt/T<10%.

In the waveform shown in FIG. 14, the difference in amplitude before and after the occurrence of the abnormal operation is larger than that in the waveform shown in FIG. 13, but is smaller than that in the waveform shown in FIG. 12. FIG. 14 shows that the noise immunity is reduced in a case in which Δt/T≤0.05%.

Figure 15:
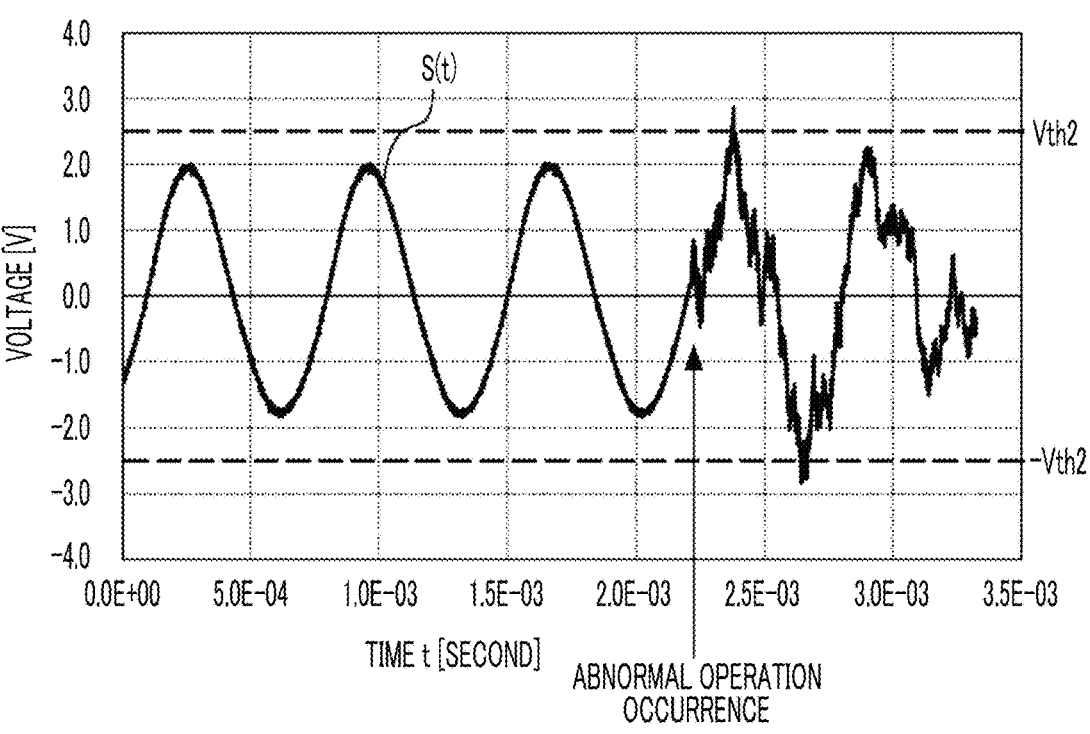
FIG. 15 is a diagram showing a determination example by a determination method in the related art based on an output signal.
Figure 16:
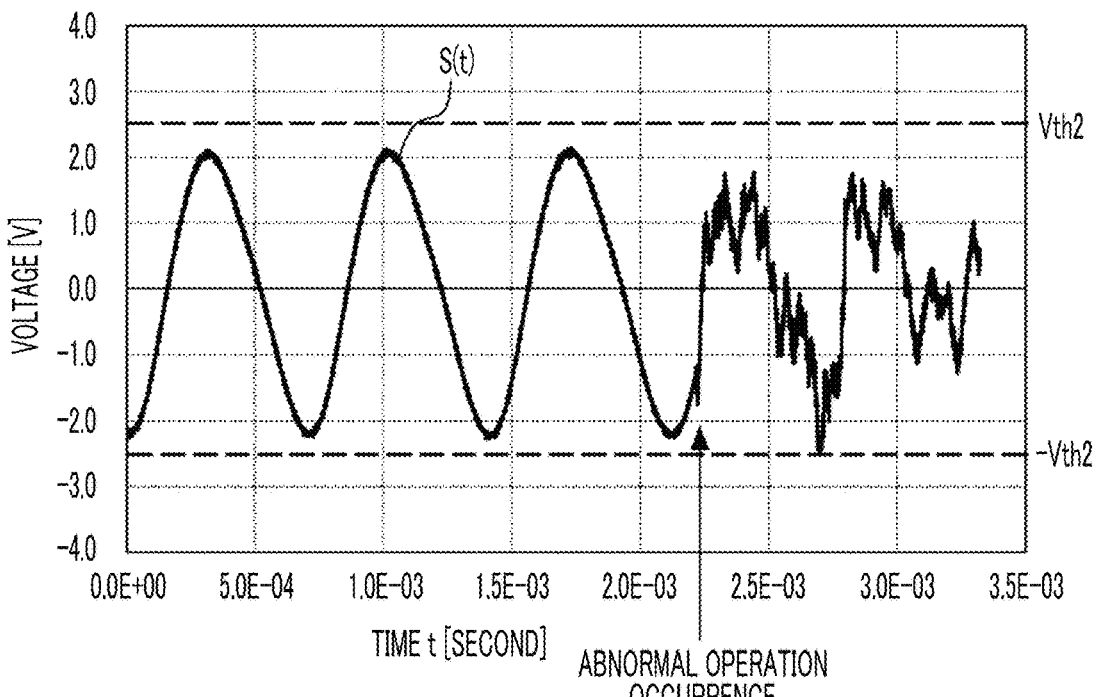
FIG. 16 is a diagram showing a determination example by a determination method in the related art based on an output signal.

FIG. 15 and FIG. 16 show a determination example by the determination method in the related art based on the output signal S (t). In the determination method in the related art, the abnormality detection is performed by comparing the output signal S (t) with a threshold value Vth2. FIG. 15 shows a case in which the amplitude increases after the occurrence of the abnormal operation. In this case, although the abnormal operation is detected even by the determination method in the related art, it takes a time for the output signal S (t) to exceed the threshold value Vth2 after the occurrence of the abnormal operation. Therefore, the abnormality detection cannot be performed at high speed. FIG. 16 shows a case in which the amplitude decreases after the occurrence of the abnormal operation. In this case, in the determination method in the related art, the abnormal operation is not detected, resulting in detection omission.

Various Modification Examples

In the above-described embodiment, although the detection part 40 is composed of the delay circuit 42 and the differential amplification circuit 43, the detection part 40 may be composed of a differential circuit. In addition, the detection part 40 may be composed of a high-pass filter. In this case, a cutoff frequency of the high-pass filter need only be set in accordance with the upper limit value of Δt/T. In addition, the detection part 40 may be composed of a band-pass filter. In this case, cutoff frequencies on a high frequency side and a low frequency side of the band-pass filter need only be set in accordance with the lower limit value and the upper limit value of Δt/T.

Since the output signal S (t) from the first angle detection sensor 31 composed of the piezoelectric element is extremely small, an amplification circuit, a buffer circuit, or the like may be added to the abnormality detection device 6. Further, a filter circuit for the purpose of reducing noise may be added to the abnormality detection device 6.

In addition, in the above-described embodiment, although the abnormality detection device 6 is composed of an analog circuit, a part or entirety of the abnormality detection device 6 may be composed of a digital circuit. For example, a signal obtained by digitizing the output signal S (t) with an analog to digital converter (ADC) may be processed by software (program). In this case, a general-purpose processor can be used as the abnormality detection device 6. The general-purpose processor includes a central processing unit (CPU), a programmable logic device (PLD), a dedicated electric circuit, or the like. The processor performs detection processing and determination processing.

Further, in the above-described embodiment, although the abnormality detection device 6 performs the abnormality detection based on the output signal from the first angle detection sensor 31, the abnormality detection device 6 may perform the abnormality detection based on the output signal from the second angle detection sensor 32. The abnormality detection device 6 may perform the abnormality detection based on each of two output signals from the first angle detection sensor 31 and the second angle detection sensor 32. In this case, for example, the abnormality detection device 6 determines that the abnormal operation has occurred in a case in which the temporal fluctuation amount of any one of two output signals is equal to or greater than the threshold value.

In addition, in the above-described embodiment, although a micromirror device having a mirror swingable around two axes is used, the micromirror device may have a mirror swingable around one axis. That is, the micromirror device need only include a mirror swingable around at least one axis, an actuator that allows the mirror to swing, and a piezoelectric element that generates and outputs an electromotive force by the swinging of the mirror.

All documents, patent applications, and technical standards mentioned in this specification are incorporated herein by reference to the same extent as in a case where each document, each patent application, and each technical standard are specifically and individually described by being incorporated by reference.

What is claimed is:

1. An optical scanning device comprising:

a micromirror device including a mirror that has a reflecting surface for reflecting light and is swingable around at least one axis, an actuator that allows the mirror to swing, and a piezoelectric element that generates and outputs electromotive force by the swinging of the mirror;

a control device configured to control an operation of the actuator and to cause the mirror to resonate with a fixed swing period by driving the actuator; and an abnormality detection device configured to detect an abnormal operation of the mirror based on a temporal fluctuation amount in an output signal from the piezoelectric element, the abnormality detection device including a detection part configured to detect the fluctuation amount and a determination part configured to determine whether or not the fluctuation amount is equal to or greater than a threshold value, wherein the detection part is configured of a delay circuit that delays the output signal output from the piezoelectric element by a certain period of time, and a differential amplification circuit that amplifies and outputs a difference between the output signal output from the piezoelectric element and the output signal delayed by the delay circuit.

2. The optical scanning device according to claim 1, wherein the abnormality detection device detects an amount by which the output signal fluctuates in a time interval smaller than 10% of the swing period, as the fluctuation amount.

3. The optical scanning device according to claim 1, wherein the abnormality detection device detects an amount by which the output signal fluctuates in a time interval smaller than 10% and larger than 0.05% of the swing period, as the fluctuation amount.

4. The optical scanning device according to claim 1, wherein the determination part is a comparator.

5. The optical scanning device according to claim 1, wherein the mirror is swingable around a first axis and a second axis that are orthogonal to each other, and the piezoelectric element generates the electromotive force by the swinging of the mirror around the first axis or the second axis.

\* \* \* \* \*